United States Patent
Hung (10) Patent No.: US 11,889,940 B2
(45) Date of Patent: Feb. 6, 2024

(54) PILLOW WITH CONTROLLING FUNCTION AND CONTROLLING METHOD FOR THE SAME

(71) Applicant: Shun-Tien Hung, Taichung (TW)

(72) Inventor: Shun-Tien Hung, Taichung (TW)

(*) Notice: Subject to any disclaimer, the term of this patent is extended or adjusted under 35 U.S.C. 154(b) by 416 days.

(21) Appl. No.: 17/327,919

(22) Filed: May 24, 2021

(65) Prior Publication Data

US 2022/0175162 A1 Jun. 9, 2022

(30) Foreign Application Priority Data

Dec. 7, 2020 (TW) .................................. 109143060

(51) Int. Cl.
*A47G 9/10* (2006.01)
*G05B 15/02* (2006.01)
*A47G 9/00* (2006.01)

(52) U.S. Cl.
CPC ........... *A47G 9/1045* (2013.01); *G05B 15/02* (2013.01); *A47G 9/10* (2013.01); *A47G 2009/006* (2013.01); *A61G 2203/34* (2013.01)

(58) Field of Classification Search
CPC .. A47G 9/1045; A47G 9/10; A47G 2009/006; G05B 15/02; G05B 15/00; A61G 2203/34; A61G 2203/30; A47C 23/06; A47C 23/061
USPC ........ 5/639, 640, 642, 636, 657, 655.7, 652, 5/236.1, 241
See application file for complete search history.

(56) References Cited

U.S. PATENT DOCUMENTS

| | | | | |
|---|---|---|---|---|
| 5,713,741 A * | 2/1998 | DeMars | ............... | A47G 9/1045 5/639 |
| 7,363,667 B2 * | 4/2008 | Borror | ................ | A01K 1/0353 5/904 |
| 7,380,298 B2 * | 6/2008 | Hernandez | ........... | A47G 9/1045 5/639 |
| 7,587,771 B2 * | 9/2009 | Borror | ................ | A47D 15/001 5/652 |
| 2007/0061975 A1 * | 3/2007 | Hernandez | ........... | A47G 9/1045 5/639 |
| 2007/0251013 A1 * | 11/2007 | Borror | ................ | A01K 1/0353 5/652 |

(Continued)

FOREIGN PATENT DOCUMENTS

| | | | | |
|---|---|---|---|---|
| CN | 202182139 | | 4/2012 | |
| EP | 3922142 A1 * | 12/2021 | ........... | A47G 9/1009 |

(Continued)

*Primary Examiner* — Robert G Santos
(74) *Attorney, Agent, or Firm* — WPAT, P.C (57) ABSTRACT

A pillow has a supporting structure, a cushion, multiple flexible sensors, and a controlling unit. The supporting structure has a supporting plate. The supporting plate has multiple supporting elements disposed at intervals. Each of the supporting elements is sheet-like. Each of the supporting elements is independently deformable by being independently pressed and independently restoring. The cushion is elastic and is supported by the supporting structure. Each of the flexible sensors is mounted to a corresponding one of the multiple supporting elements. The controlling unit is electrically connected to the multiple flexible sensors. When a user rests his head on the pillow, the user may press the flexible sensors to control a controlled device such as a speaker or a projector.

1 Claim, 11 Drawing Sheets

(56) References Cited

U.S. PATENT DOCUMENTS

| | | | | |
|---|---|---|---|---|
| 2008/0098523 A1* | 5/2008 | Borror | ............... | A01K 1/0353 |
| | | | | 5/420 |
| 2015/0342377 A1* | 12/2015 | Hall | ............... | G06F 1/163 |
| | | | | 5/639 |
| 2022/0142581 A1* | 5/2022 | Hung | ............... | A61B 5/1036 |
| 2022/0175162 A1* | 6/2022 | Hung | ............... | A47G 9/1045 |
| 2022/0299381 A1* | 9/2022 | Hung | ............... | G01L 5/16 |
| 2023/0044029 A1* | 2/2023 | Hung | ............... | A47G 9/1081 |

FOREIGN PATENT DOCUMENTS

| | | |
|---|---|---|
| TW | M395437 | 1/2011 |
| TW | M596584 | 6/2020 |
| WO | WO-2022257064 A1 * | 12/2022 |
| WO | WO-2023087309 A1 * | 5/2023 |

\* cited by examiner

PILLOW WITH CONTROLLING FUNCTION AND CONTROLLING METHOD FOR THE SAME

BACKGROUND OF THE INVENTION

1. Field of the Invention

The present invention relates to a pillow, and more particularly to a pillow with a controlling function and a controlling method of the pillow with the controlling function.

2. Description of Related Art

People spend one-third of their lives sleeping. For long-term supporting a user's cervical spine, pillows of different structural designs as well as various functions are provided.

Conventional pillows on the market already have functions of playing music, massaging, and anti-snoring deformation. In order to control the functions above, the conventional pillows mostly have buttons or wire-connected remote controllers, or the functions of the conventional pillows may be controlled via voice control.

However, the users have to control the functions of the conventional pillows with the buttons or the wired remote controllers by hand. Specifically, the user has to raise up his hand to reach and to press the buttons of the conventional pillow. With regard to the conventional pillows with the wired remote controllers, the wires of the wired remote controllers may be tangled. Moreover, the user may inadvertently press the wires and the wired remote controller of the conventional pillow while sleeping and feel uncomfortable, negatively affecting the sleep quality. In addition, controlling the conventional pillows via voice control may bother someone nearby.

To overcome the shortcomings of the conventional pillow that is controlled through the buttons or the wired remote controller, the present invention provides a pillow with a controlling function and a controlling method of the pillow with the controlling function to mitigate or obviate the aforementioned problems.

SUMMARY OF THE INVENTION

The main objective of the present invention is to provide a pillow that provides a controlling function and is easy to be operated.

The pillow has a supporting structure, a cushion, multiple flexible sensors, and a controlling unit. The supporting structure has a supporting plate. The supporting plate has multiple supporting elements disposed at intervals. Each of the supporting elements is sheet-like. And each of the supporting elements is independently deformable by being independently pressed and independently restoring. The cushion is elastic and is supported by the supporting structure. Each of the flexible sensors is mounted to a corresponding one of the multiple supporting elements. The controlling unit is electrically connected to the multiple flexible sensors. When a user rests his head on the pillow, the user may press the flexible sensors to control a controlled device such as a speaker or a projector.

Other objects, advantages, and novel features of the invention will become more apparent from the following detailed description when taken in conjunction with the accompanying drawings.

DETAILED DESCRIPTION OF PREFERRED EMBODIMENTS

Figure 1:
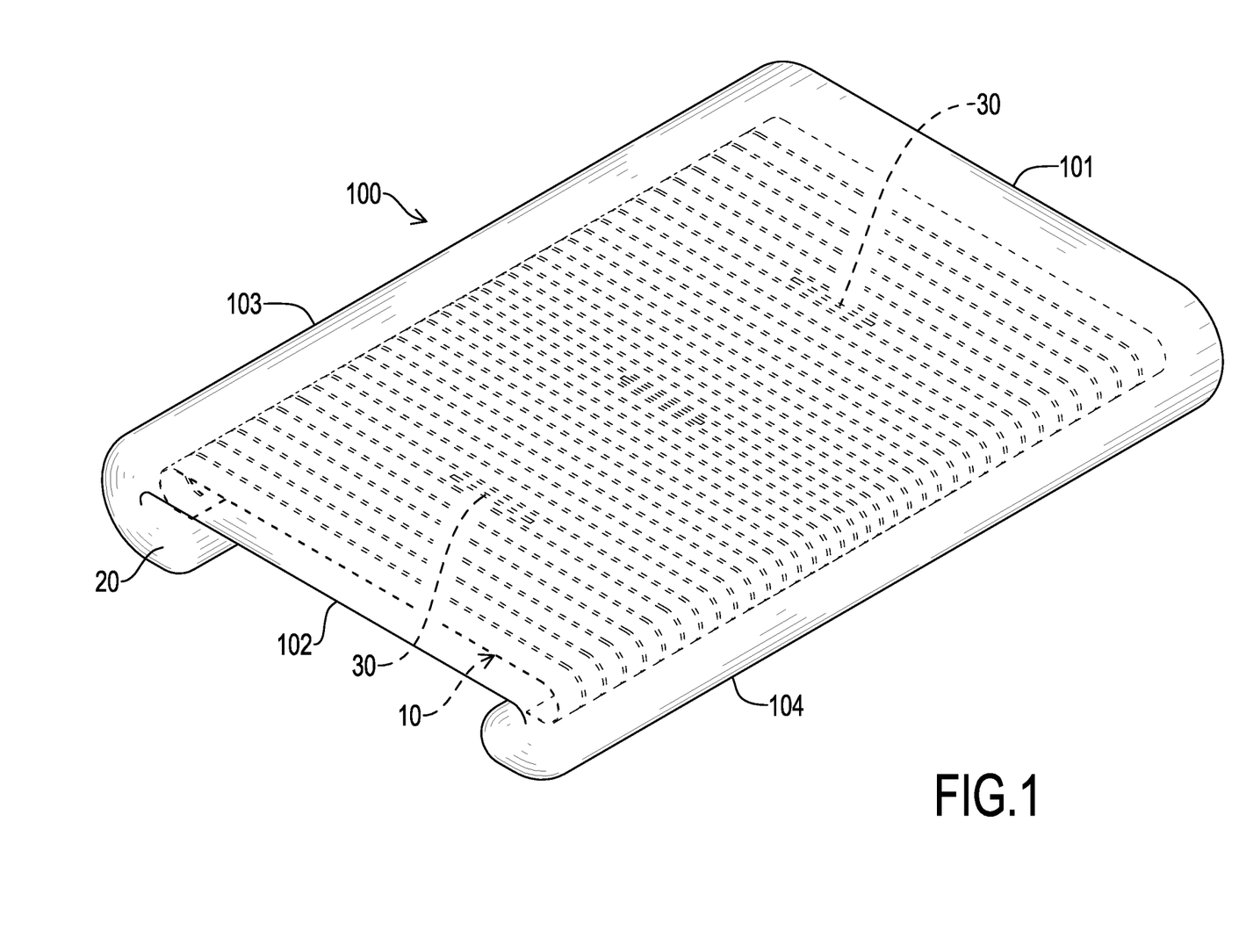
FIG. 1 is a perspective view of a first embodiment of a pillow in accordance with the present invention.
Figure 2:
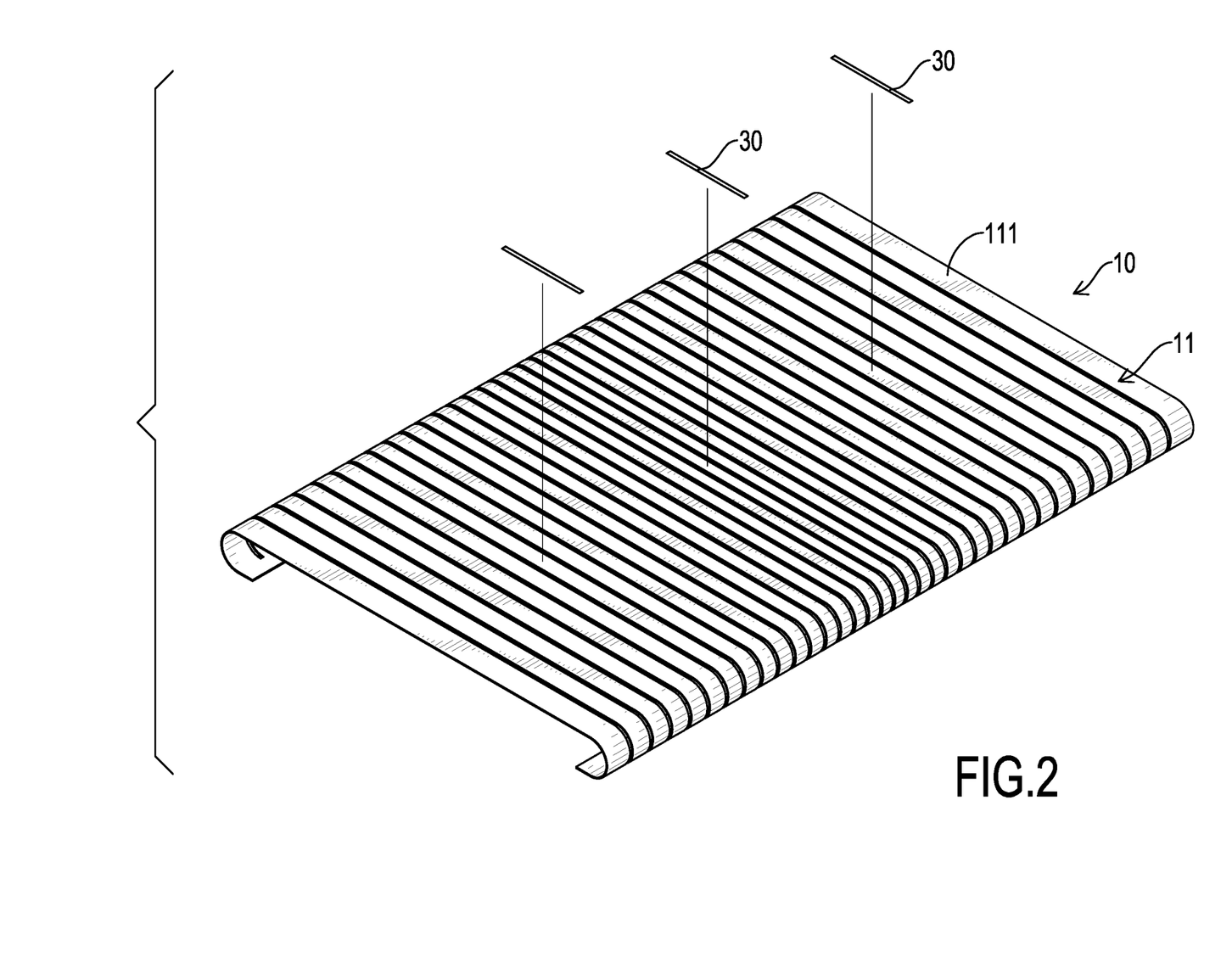
FIG. 2 is an exploded perspective view of a supporting structure and three flexible sensors of the pillow in FIG. 1.
Figure 5:
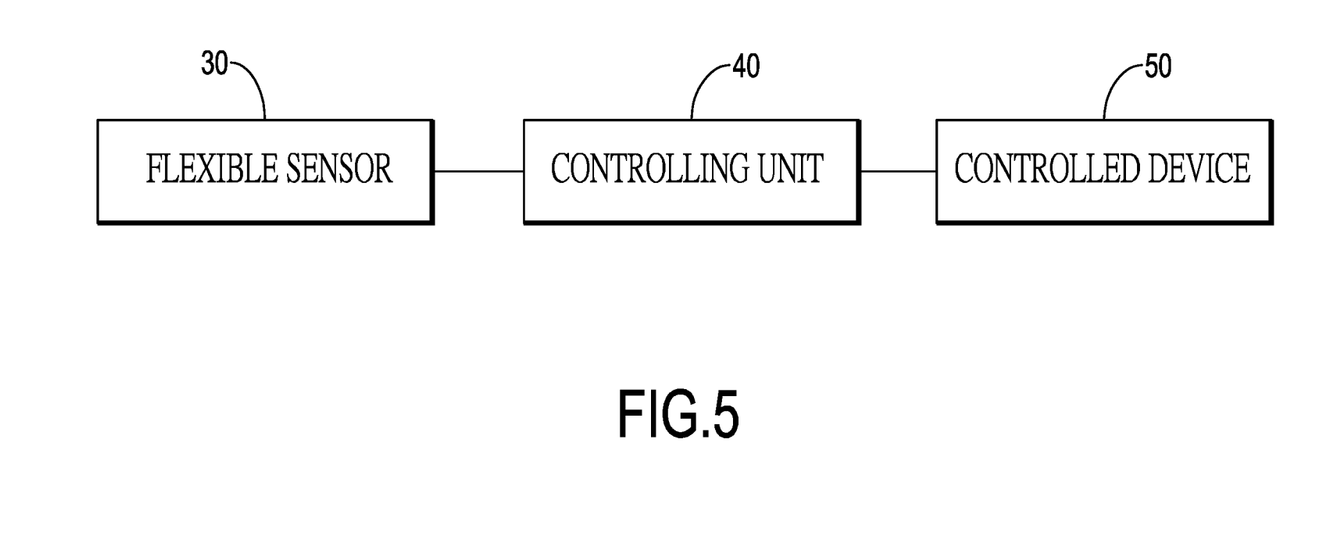
FIG. 5 is a block diagram of the pillow in FIG. 1, showing the flexible sensors, a controlling unit, and a controlled device electrically connected together.

With reference to FIGS. 1, 2, and 5, a pillow 100 in accordance with the present invention is elongated and has a lengthwise direction, a first end 101 and a second end 102 oppositely defined on the pillow 100 in the lengthwise direction of the pillow 100, two lateral sides 103, 104 parallel to the lengthwise direction of the pillow 100, and a supporting structure 10, a cushion 20, multiple flexible sensors 30, and a controlling unit 40.

Figure 3A:
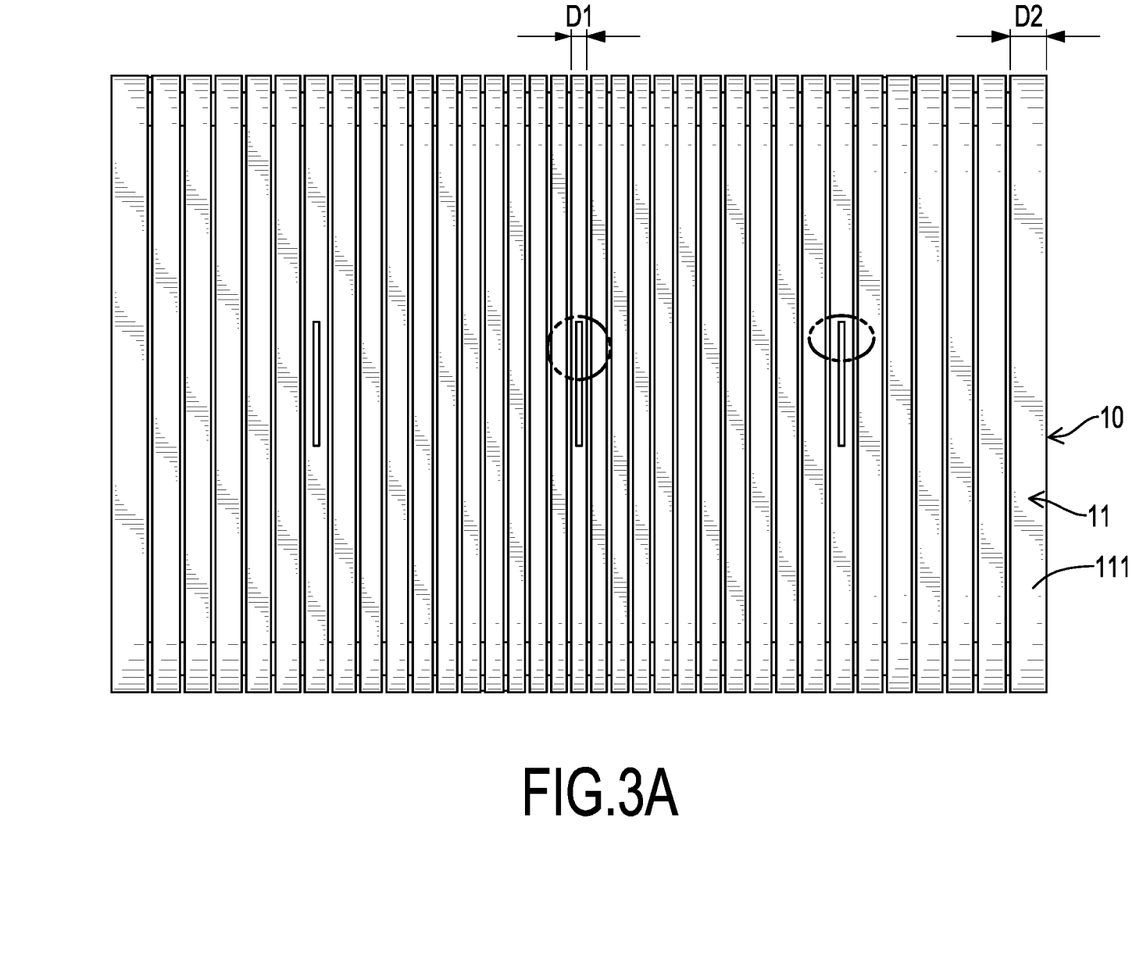
FIG. 3A is a top view of the supporting structure and the flexible sensors of the pillow in FIG. 1.
Figure 3B:
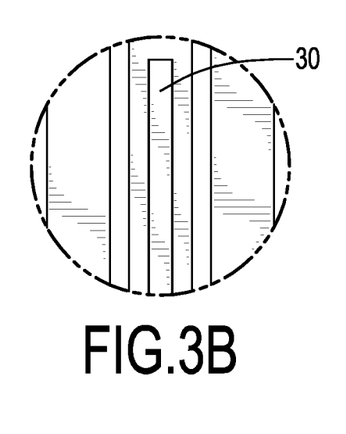
FIG. 3B is an enlarged top view of the supporting structure and one of the flexible sensors of the pillow in FIG. 3A.
Figure 3C:
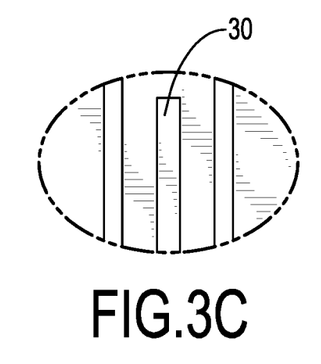
FIG. 3C is another enlarged top view of the supporting structure and the other one of the flexible sensors of the pillow in FIG. 3A.

With reference to FIGS. 1 and 2, the supporting structure 10 has a supporting plate 11. The supporting plate 11 has multiple supporting elements 111. Each supporting element 111 is sheet-like, and the multiple supporting elements 111 are arranged along the lengthwise direction of the pillow 100 and are disposed at intervals. Each supporting element 111 is independently deformable by being independently pressed and independently restoring. In the first embodiment, each supporting element 111 is elongated and has an extending direction. The extending direction of each supporting element 111 is perpendicular to the lengthwise direction of the pillow 100. Each supporting element 111 extends to the two lateral sides 103, 104 of the pillow 100. The multiple supporting elements 111 are parallel to one another and are disposed at intervals. Practically, each supporting element 111 may be annular, and the multiple supporting elements 111 are arranged coaxially. As long as each supporting element 111 can be independently pressed, can be independently deformed, and can independently restore, patterns of arrangement of the multiple supporting elements 111 and the contour of each supporting element 111 are not restricted. With reference to FIGS. 2 and 3, each supporting element 111 has a width. The widths of the multiple supporting elements 111 gradually decrease from the first end and the second end 101, 102 of the pillow 100 towards a middle section of the pillow 100. For example, in FIG. 3, one of the multiple supporting elements 11 adjacent to the first end of the pillow 100 has a width D2 of 18 mm, and the other one of the multiple supporting elements 11 disposed at the middle section of the pillow 100 has a width D1 of 10 mm.

In the present invention, the supporting structure 10 is made of a composite material with thermoplastic resin. Practically, the supporting structure 10 may be made of metal, plastic, or even wood as long as each of the multiple supporting elements 11 can be independently pressed, can be independently deformed, and can independently restore. The material of the independent supporting structure 10 is not restricted.

Figure 4A:
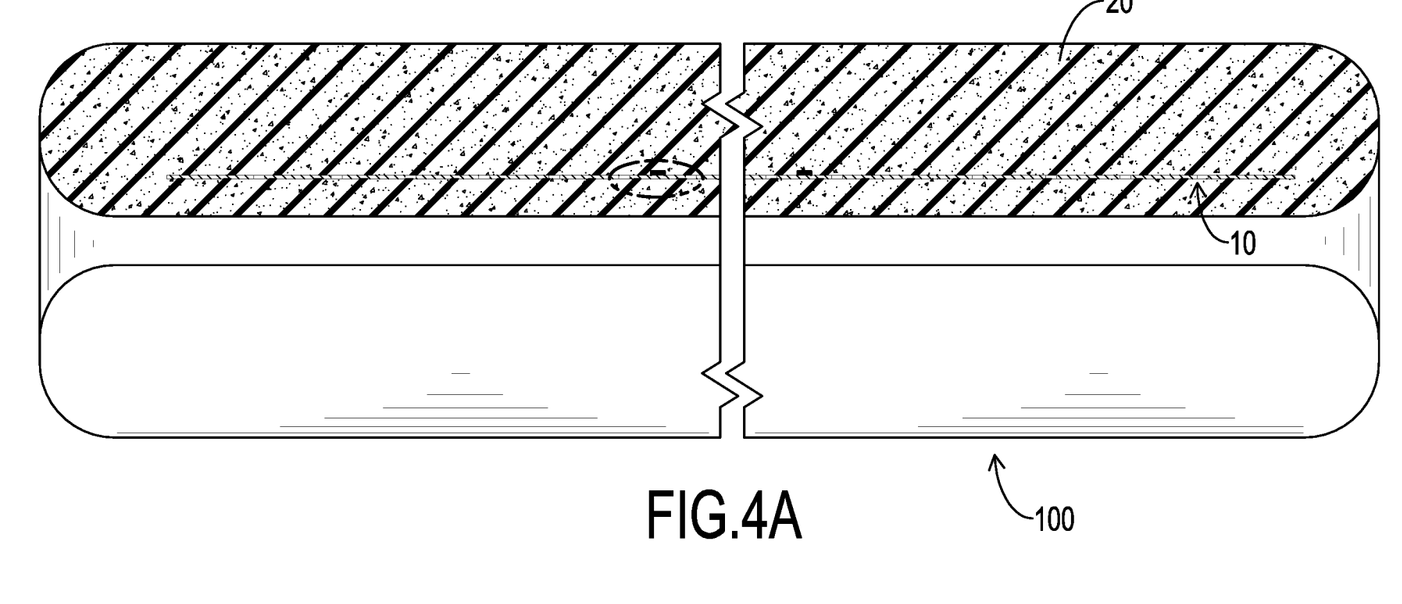
FIG. 4A is a cross-sectional side view of the pillow in FIG. 1.
Figure 4B:
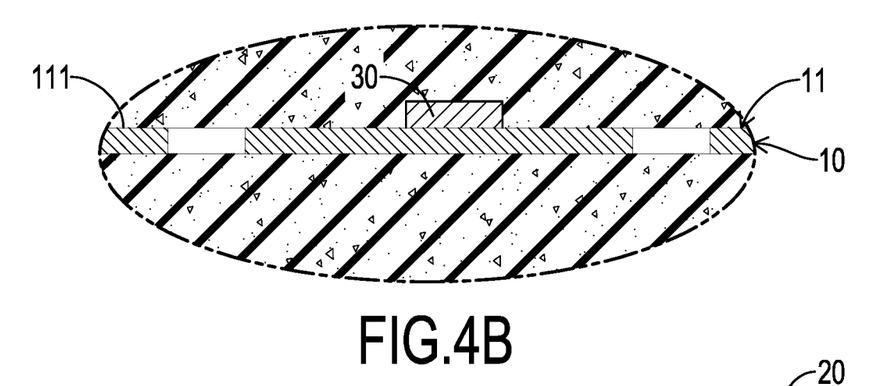
FIG. 4B is an enlarged cross-sectional side view of the pillow in FIG. 4A.

With reference to FIGS. 1, 4A, and 4B, the cushion 20 is elastic, is configured for a head of a user to rest thereon, or is configured to contact a bed for supporting the present invention. The cushion 20 may be made of foam material, rubber, emulsion, or similar flexible materials. In the first embodiment of the present invention, the cushion 20 is fully wrapped around the supporting structure 10. Practically, the pillow 100 may merely have the cushion 20 disposed above the supporting structure 10, that is, the cushion 20 is only disposed at a portion for the user's head to rest thereon. Besides, the present invention may have a pillow case sleeved on the cushion 20.

With reference to FIGS. 1, 2, 3A, 3B, and 3C, in the first preferred embodiment of the present invention, the multiple flexible sensors 30 include three flexible sensors 30. Each flexible sensor 30 includes a flexible printed circuit. Each flexible sensor 30 may be a pressure sensor or a flex sensor, and each flexible sensor 30 is disposed at a corresponding one of the multiple supporting elements 111. Deformation of the corresponding one of the multiple supporting elements 111 of each flexible sensor 30 is transferred to an electrical signal. After the electrical signal is amplified by programs or amplifiers, the flexible sensor 30 outputs the electrical signal.

With reference to FIGS. 1, 2, 3A, 3B, and 3C, in the first embodiment, one of the three flexible sensors 30 is disposed at one of the supporting elements disposed at a central position of the supporting plate 11, another one of the three flexible sensors 30 is disposed at a seventh one of the supporting elements 111 counted from the first end 101 of the pillow 100, and the other one of the three flexible sensors 30 is disposed at a seventh one of the supporting elements 111 counted from the second end 102 of the pillow 100. The three flexible sensors 30 obtain information as the user's head is rested on the pillow 100. Each flexible sensor 30 measures a loaded pressure, a duration of pressure loading, and a number of the pressure loading from a corresponding one of the supporting element 111 of the flexible sensor 30.

With reference to FIGS. 2, 3A, 3B, 4A, and 4B, in the first embodiment, each flexible sensor 30 is a pressure sensor. The three flexible sensors 30 are respectively disposed on top surfaces of corresponding three supporting elements 111. When the cushion 20 is pressed by the user's head, stress is transmitted to each flexible sensor 30. Then, each flexible sensor 30 collects values of the loaded pressure, of the duration of the pressure loading, and of the number of the pressure loading of a corresponding one supporting element 111 of the flexible sensor 30.

Figure 9A:
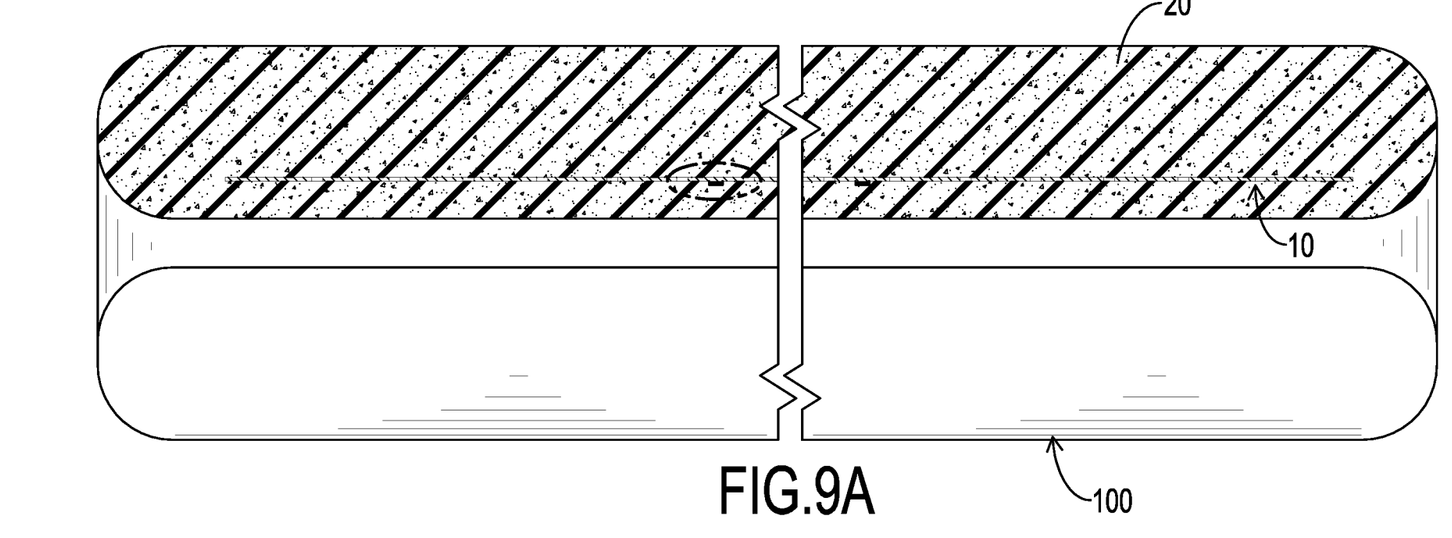
FIG. 9A is a cross-sectional side view of a second embodiment of a pillow in accordance with the present invention.
Figure 9B:
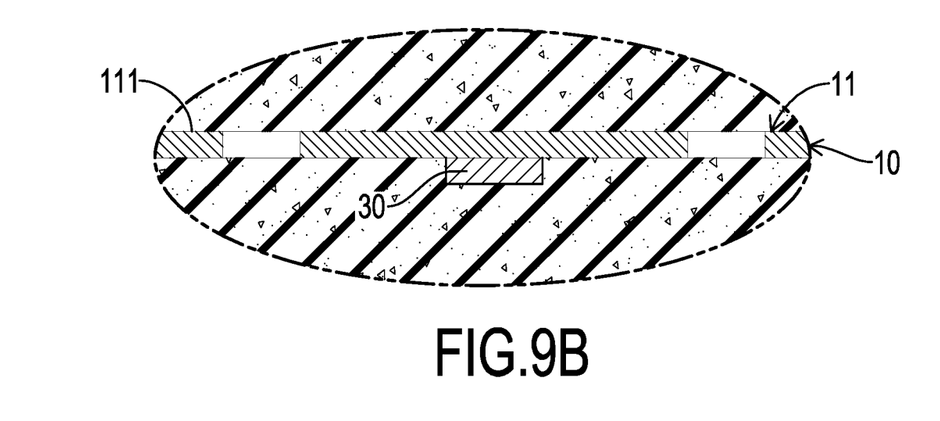
FIG. 9B is an enlarged cross-sectional side view of the pillow in FIG. 9A.

With reference to FIGS. 9A and 9B, in a second embodiment of the present invention, each flexible sensor 30 is a flex sensor. The three flexible sensors 30 are respectively disposed on bottom surfaces of three corresponding supporting elements 111. When the cushion 20 is pressed by the user's head, the stress is transmitted to each supporting element 111. Each flexible sensor 30 also collects values of the loaded pressure, of the duration of the pressure loading, and of the number of the pressure loading of a corresponding supporting element 111 of the flexible sensor 30 as the corresponding supporting element 111 is deformed.

The controlling unit 40 is a conventional device and has a processor, a memory, and a communication device. With reference to FIG. 5, the controlling unit 40 is electrically connected to the three flexible sensors 30 and is able to receive values of the loaded pressure, of the duration of the pressure loading, and of the number of the pressure loading transmitted from each flexible sensor 30.

With reference to FIG. 5, the controlling unit 40 can be connected to a controlled device 50 via wired or wireless transmission for controlling the controlled device 50. The controlled device 50 may be a portable media player, a speaker, or a projector 60. The controlled device 50 may even be a mobile device that controls the controlled device 50 such as the speaker or the projector 60 via mobile applications of the mobile device.

Figure 6:
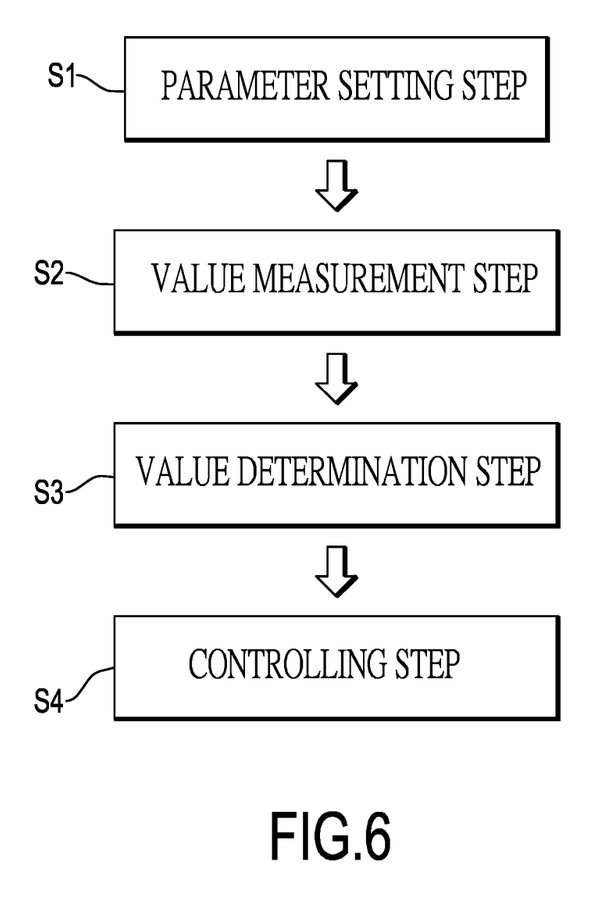
FIG. 6 is a process flow of a controlling method of the pillow in accordance with the present invention.

With reference to FIG. 6, the controlling method of the pillow with a controlling function in accordance with the present invention comprises a parameter setting step S1, a value measurement step S2, a value determination step S3, and a controlling step S4.

The parameter setting step S1 includes setting at least one threshold range of a duration of pressure loading, at least one threshold range of a loaded pressure, and a threshold number of the pressure loading. The threshold ranges of the duration of the pressure loading and of the loaded pressure, and the threshold number of the pressure loading may be determined according to various functions such as turn on, volume control, fast forward, slow down, or repeat. Different functions correspond to different threshold ranges of the duration of the pressure loading and of the loaded pressure and the threshold number of the pressure loading. Practically, a same combination of the threshold ranges of the duration of the pressure loading and of the loaded pressure and the threshold number of the pressure loading may be respectively applied to different functions. Among people of different age groups, disparities exist in time to fall asleep and in weight of their heads. Therefore, the threshold range of the duration of the pressure loading and the threshold range of the loaded pressure may be adjusted according to users of different age groups.

In the value measurement step S2, each flexible sensor 30 senses a measured duration of pressure loading, a measured loaded pressure, and a measured number of the pressure loading and transmits values of the measured duration of the pressure loading, of the measured loaded pressure, and of the measured number of the pressure loading to the controlling unit 40.

In the value determination step S3, the controlling unit 40 determines whether the measured duration of the pressure loading sensed by each flexible sensor 30 falls within one of the at least one threshold range of the duration of the pressure loading, whether the measured loaded pressure sensed by each flexible sensor 30 falls within one of the at least one threshold range of the pressure loaded, and whether the number of the measured pressure loading sensed by each flexible sensor 30 matches the number of the pressure loading.

In the controlling step S4, when the controlling unit 40 determines that the measured duration of the pressure loading and the measured loaded pressure sensed by each flexible sensor 30 respectively falls within one of the at least one threshold range of the duration of the pressure loading and one of the at least one threshold range of the loaded pressure set in the parameter setting step S1, and the controlling unit 40 determines that the measured number of the pressure loading sensed by each flexible sensor 30 matches the threshold number of the pressure loading set in the parameter setting step S1, the controlling unit 40 sends a controlling signal to a controlled device 50. The controlled device 50 may be a speaker or a projector. The controlled device 50 may be a mobile device such as a cell phone or a tablet computer that controls the speaker or the projector via the mobile application of the mobile device.

Figure 7:
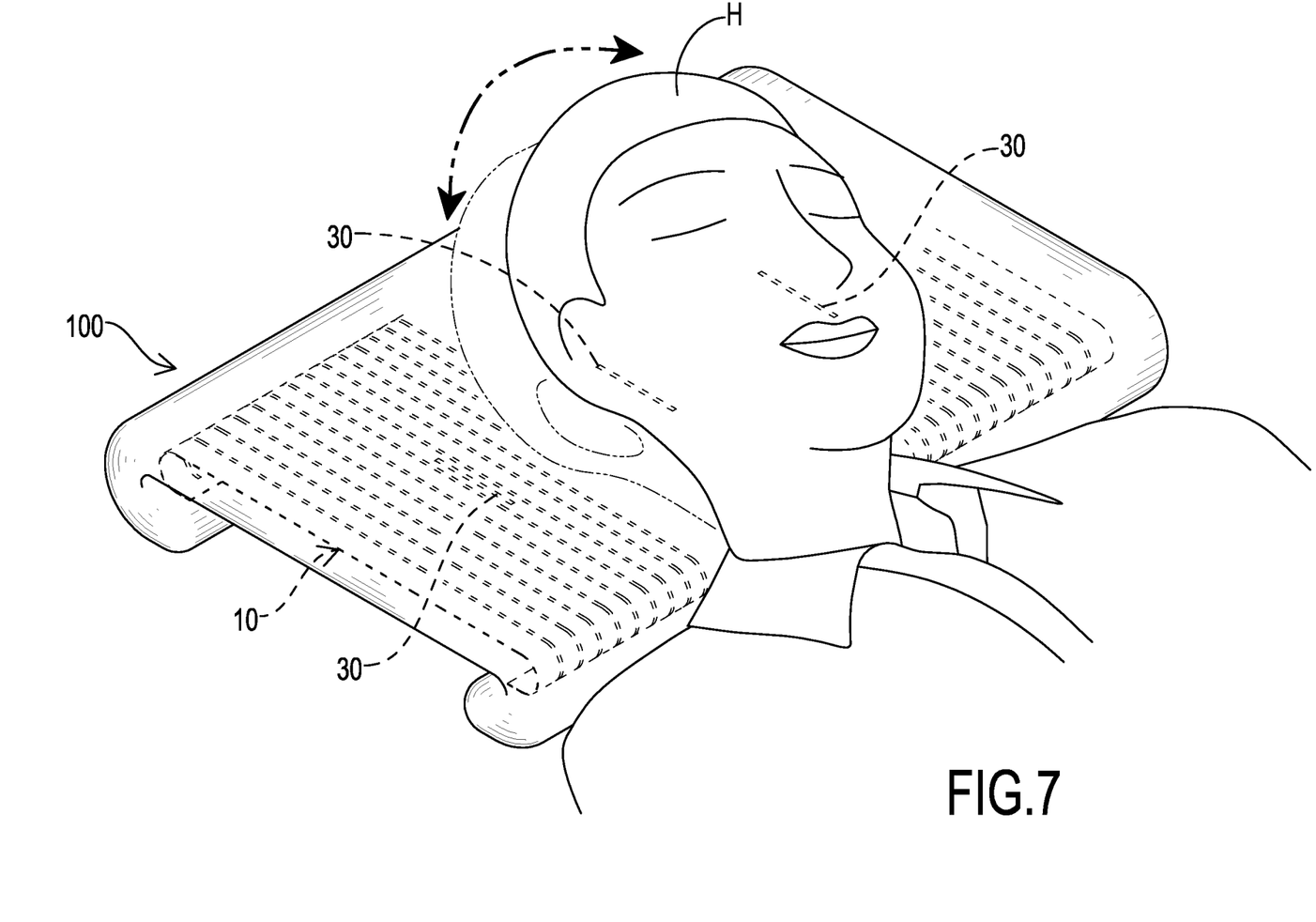
FIG. 7 is an operational perspective view of the pillow in FIG. 1, showing a user's head rested on the pillow.
Figure 8:
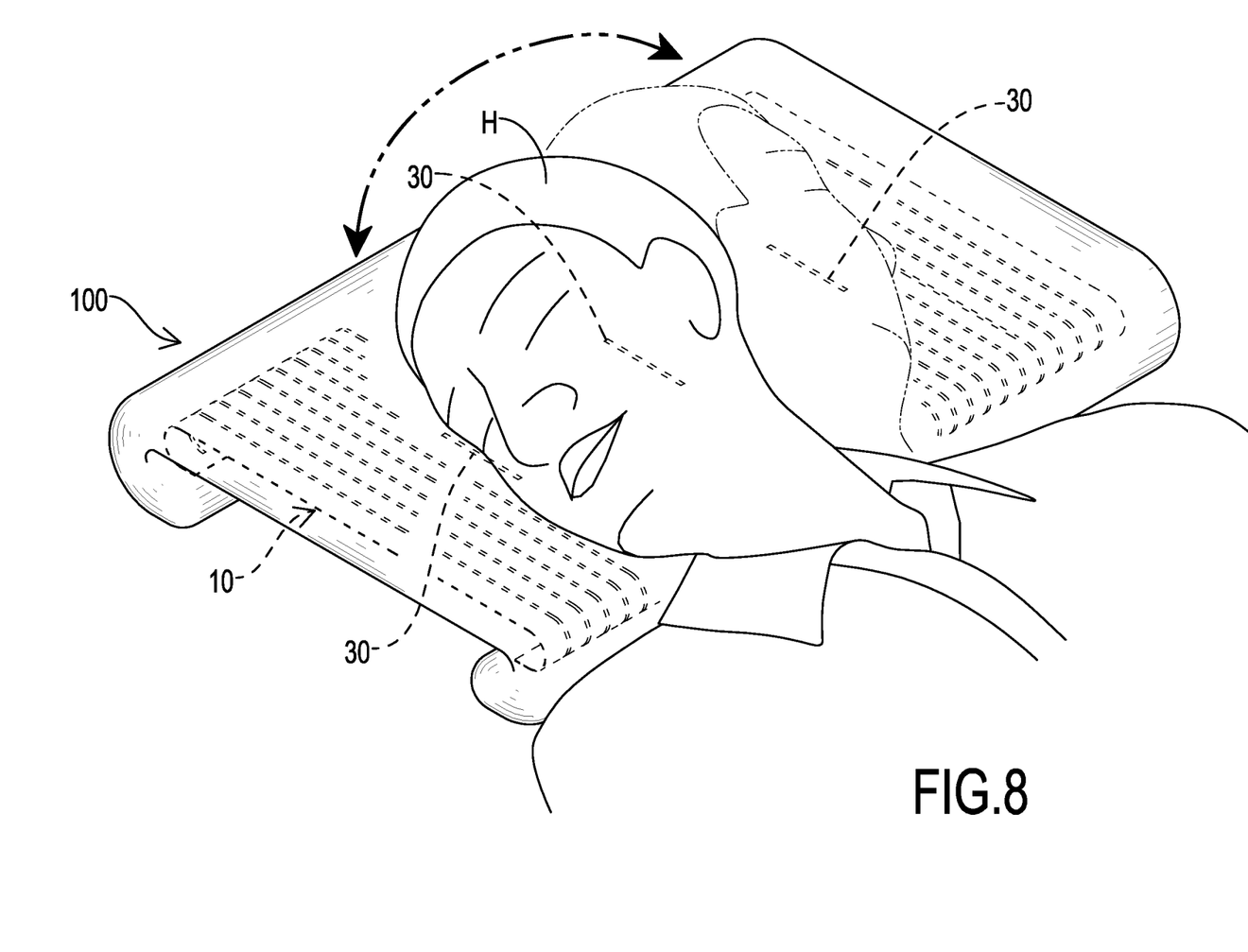
FIG. 8 is another operational perspective view of the pillow in FIG. 1, showing the user's head rested on the pillow.

With reference to FIGS. 7 and 8, when the user's head H is rested on the pillow 100 of the present invention, the user may raise up and lay down his head to press the three flexible sensors 30. The user may turn his head to apply force on the three flexible sensors 30 and to control the speaker or the projector via the controlling method mentioned above.

In the present invention, the flexible sensors 30 are disposed at the supporting elements 111 of the supporting plate 11. Each flexible sensor 30 measures the values of the loaded pressure, of the duration of the pressure loading, and of the number of the pressure loading, and the flexible sensor 30 transmits these values to the controlling unit 40. The controlling unit 40 make determinations on these values and sends the controlling signal to the controlled device 50 according to result of determination. The controlling unit 40 may send the controlling signal to the mobile device according to the result of the determination and controls media players via the mobile applications of the mobile device.

Compared to the conventional pillow having buttons or with functions of wired remote or voice control, the pillow 100 of the present invention is convenient in operating, is simple in structure, and is free from making noise and from bothering someone nearby.

In addition, the controlling method of the pillow 100 of the present invention can use the values of the loaded pressure, of the duration of the pressure loading, and of the number of the pressure loading of a corresponding supporting element 111 measured by each flexible sensor 30. The pillow 100 can control various electronic products by permutations and combinations of the values of the loaded pressure, of the duration of the pressure loading, and of the number of the pressure loading.

Figures 10A, 10B:
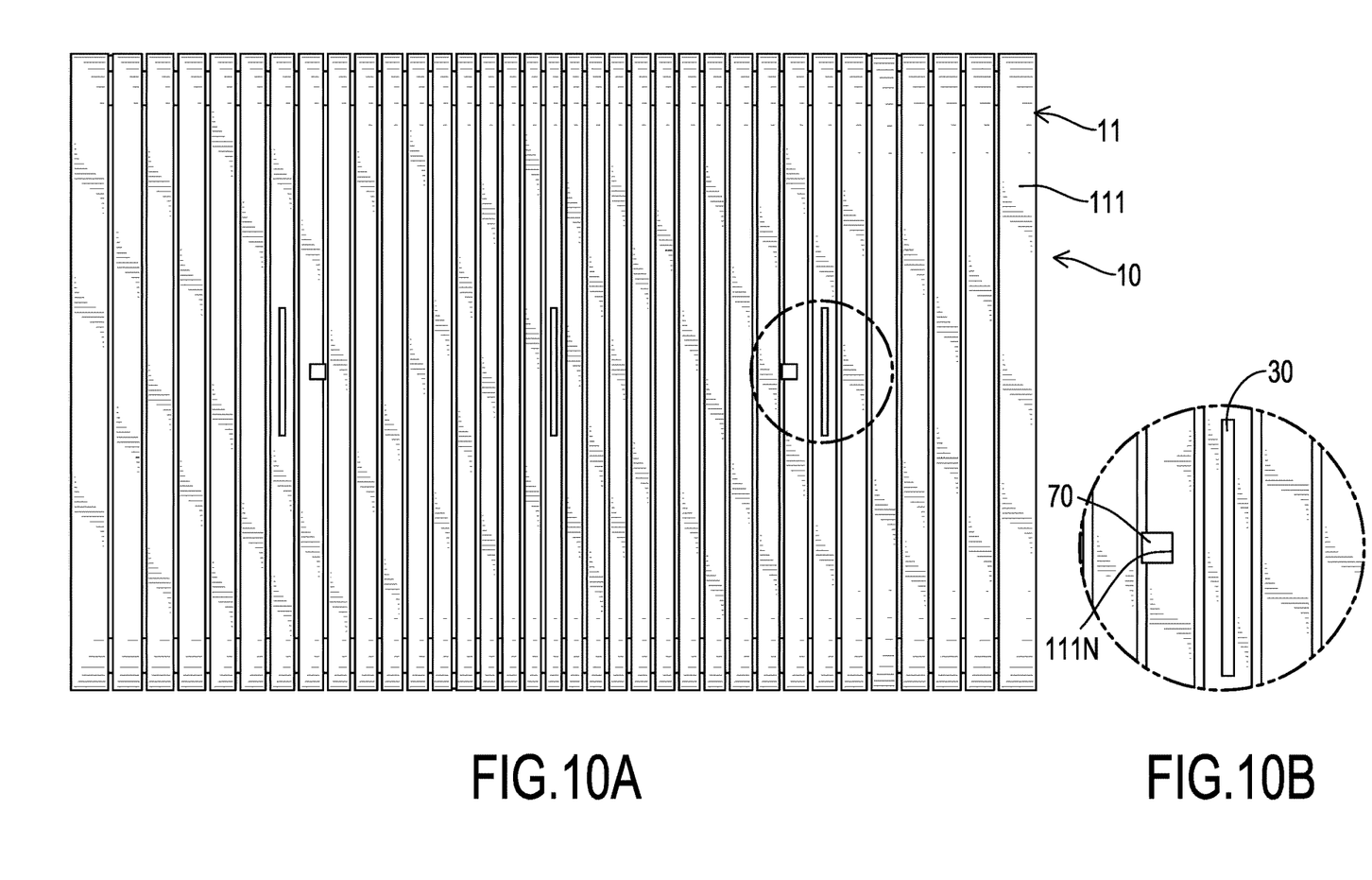
FIG. 10A is a top view of a third embodiment of a supporting structure, three flexible sensors, and two speakers of a pillow in accordance with the present invention.
FIG. 10B is an enlarged top view of the third embodiment of the pillow in FIG. 10A.

With reference to FIGS. 10A and 10B, in a third embodiment of the present invention, the pillow further has two speakers 70. Each speaker 70 is an electrostatic loudspeaker having a loudspeaker diaphragm made of ceramic material. One of the speakers 70 is disposed at an eighth one of the supporting elements 111 counted from the first end 101 of the pillow 100, and the other speaker 70 is disposed at an eighth one of the supporting elements 111 counted from the second end 102 of the pillow 100. The two speakers 70 are respectively disposed at two of the supporting elements 111 respectively adjacent to two ears of the user. Each supporting element 111 mounted with one of the speakers 70 has a notch 111N to expose the speaker 70.

In the third embodiment, the three flexible sensors 30 respectively correspond to three functions. One of the flexible sensors 30 corresponds to a turn on function of the two speakers 70, the other two flexible sensors 30 correspond to a volume adjustment function of the two speakers 70. With reference to FIG. 7, the user raises up and lays down his head H twice to press the supporting element 111 disposed at the central position of the supporting plate 11 twice to turn on the two speakers 70 via the controlled device 50. With reference to FIG. 8, the user turns his head to press another one of the supporting elements 111 adjacent to the second end 102 of the pillow 100 twice to turn up the volume of the speakers 70, and the user turns his head to press the other one of the supporting elements 111 adjacent to the first end 101 of the pillow 100 twice to turn down the volume of the speakers 70.

The three flexible sensors 30 of the third embodiment respectively correspond to functions of turning on the speakers 70, turning up the volume, and turning down the volume. Practically, the amount of the flexible sensors 30 may be modified according to amount of functions. The amount of the flexible sensors 30 is not restricted in the present invention.

Figure 11:
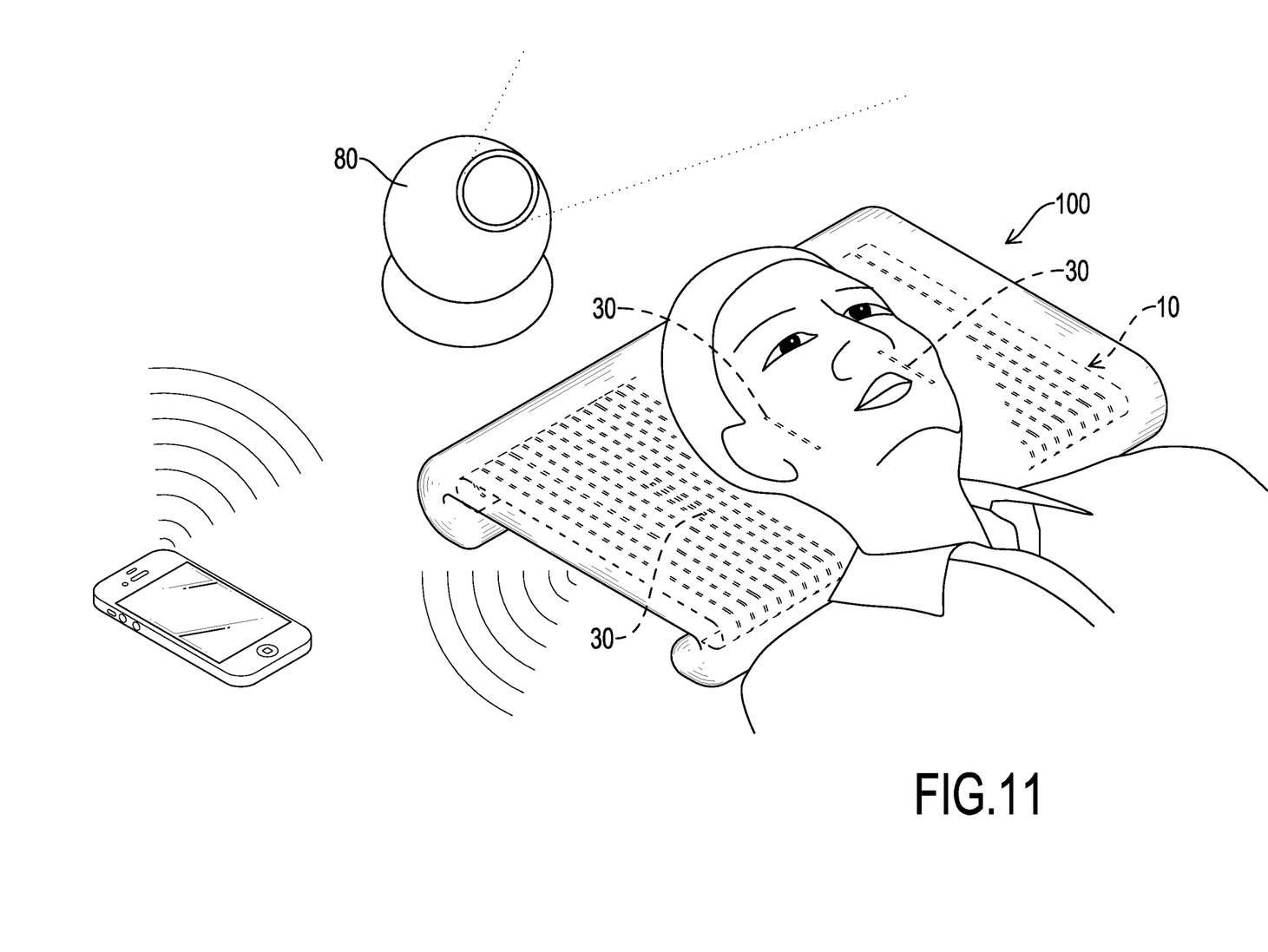
FIG. 11 is an operational perspective view of the pillow in accordance with the present invention, showing the pillow and a projector working together.

With reference to FIG. 11, the pillow 100 of the present invention may work with a projector 80. When the user lays down and rests his head on the pillow 100 of the present invention, the user may operate the pillow 100 by his head H to control the projector 80 via a cell phone. The projector 80 projects images on the ceiling, and the user may achieve the functions of fast forward or slow down by operating the pillow 100 by his head.

At last, the pillow of the present invention may be also applied to mattresses, seat cushions, or back cushions and work together with various electronic products.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A controlling method for a pillow with a controlling function, the pillow having a supporting structure having a supporting plate with multiple supporting elements disposed at intervals, and each of the supporting elements being sheet-like and being independently deformable by being independently pressed and independently restoring, a cushion being elastic and supported by the supporting structure, multiple flexible sensors and each of the flexible sensors mounted to a corresponding one of the multiple supporting elements, and a controlling unit electrically connected to the multiple flexible sensors; wherein the controlling method comprises steps as follows:

a parameter setting step: setting at least one threshold range of a duration of pressure loading, at least one threshold range of a loaded pressure, and a threshold number of the pressure loading;

a value measurement step: each flexible sensor sensing a measured duration of pressure loading, a measured loaded pressure, and a measured number of the pressure loading, and transmitting values of the measured duration of the pressure loading, of the measured loaded pressure, and of the measured number of the pressure loading to the controlling unit;

a value determination step: the controlling unit determining whether the measured duration of the pressure loading sensed by each flexible sensor falls within one of the at least one threshold range of the duration of the pressure loading, whether the measured loaded pressure sensed by each flexible sensor falls within one of the at least one threshold range of the loaded pressure, and whether the number of the measured pressure loading sensed by each flexible sensor matches the threshold number of the pressure loading; and a controlling step: when the controlling unit determines that the measured duration of the pressure loading and the measured loaded pressure sensed by each flexible sensor respectively fall within one of the at least one threshold range of the duration of the pressure loading and one of the at least one threshold range of the loaded pressure set in the parameter setting step, and when the controlling unit determines that the measured number of the pressure loading sensed by each flexible sensor matches the measured number of the pressure loading set in the parameter setting step, the controlling unit sends a controlling signal to a controlled device.

\* \* \* \* \*